(12) United States Patent
Rubinstein et al.

(10) Patent No.: US 9,805,475 B2
(45) Date of Patent: *Oct. 31, 2017

(54) EULERIAN MOTION MODULATION

(75) Inventors: Michael Rubinstein, Somerville, MA (US); Neal Wadhwa, Cambridge, MA (US); Frederic Durand, Boston, MA (US); William T. Freeman, Acton, MA (US); Hao-yu Wu, Cambridge, MA (US); Eugene Inghaw Shih, Brookline, MA (US); John V. Guttag, Lexington, MA (US)

(73) Assignees: Massachusetts Institute of Technology, Cambridge, MA (US); Quanta Computer Inc., Tao Yuan Shein (TW)

( * ) Notice: Subject to any disclaimer, the term of this patent is extended or adjusted under 35 U.S.C. 154(b) by 462 days.

This patent is subject to a terminal disclaimer.

(21) Appl. No.: 13/607,173

(22) Filed: Sep. 7, 2012

(65) Prior Publication Data

US 2014/0072228 A1    Mar. 13, 2014

(51) Int. Cl.
*G06K 9/00* (2006.01)
*G06T 7/207* (2017.01)
*G06T 7/262* (2017.01)

(52) U.S. Cl.
CPC ............ *G06T 7/207* (2017.01); *G06T 7/262* (2017.01); *G06T 2207/10024* (2013.01)

(58) Field of Classification Search
None
See application file for complete search history.

(56) References Cited

U.S. PATENT DOCUMENTS

| | | | |
|---|---|---|---|
| 4,063,281 A * | 12/1977 | Kornreich et al. | 382/280 |
| 7,821,546 B2 | 10/2010 | Sakamoto et al. | |
| 9,324,005 B2 | 4/2016 | Wadhwa et al. | |
| 9,338,331 B2 | 5/2016 | Wadhwa et al. | |
| 2007/0115370 A1 | 5/2007 | Sakamoto et al. | |
| 2007/0185393 A1 | 8/2007 | Zhou et al. | |
| 2008/0037906 A1* | 2/2008 | Yano et al. | 382/312 |
| 2009/0208080 A1 | 8/2009 | Grau et al. | |
| 2009/0304246 A1* | 12/2009 | Walker et al. | 382/128 |

(Continued)

OTHER PUBLICATIONS

Wadhwa, Neal, et al. "Riesz pyramids for fast phase-based video magnification." Computational Photography (ICCP), 2014 IEEE International Conference on. IEEE, 2014.*

(Continued)

*Primary Examiner* — Sean Conner
(74) *Attorney, Agent, or Firm* — Hamilton, Brook, Smith & Reynolds, P.C.

(57) ABSTRACT

In one embodiment, a method of amplifying temporal variation in at least two images includes converting two or more images to a transform representation. The method further includes, for each spatial position within the two or more images, examining a plurality of coefficient values. The method additionally includes calculating a first vector based on the plurality of coefficient values. The first vector can represent change from a first image to a second image of the at least two images describing deformation. The method also includes modifying the first vector to create a second vector. The method further includes calculating a second plurality of coefficients based on the second vector.

10 Claims, 13 Drawing Sheets

(56) References Cited

U.S. PATENT DOCUMENTS

| | | | |
|---|---|---|---|
| 2010/0166300 A1* | 7/2010 | Spampinato et al. | 382/162 |
| 2014/0072190 A1* | 3/2014 | Wu et al. | 382/128 |
| 2014/0072228 A1* | 3/2014 | Rubinstein et al. | 382/197 |
| 2014/0072229 A1* | 3/2014 | Wadhwa et al. | 382/197 |
| 2014/0153692 A1 | 6/2014 | Larkin et al. | |
| 2015/0124062 A1 | 5/2015 | Didyk et al. | |
| 2015/0195430 A1 | 7/2015 | Wadhaw et al. | |

OTHER PUBLICATIONS

Wadhwa, Neal, et al. "Phase-based video motion processing." ACM Transactions on Graphics (TOG) 32.4 (2013): 80.*

Viola, Paul, and Michael J. Jones. "Robust real-time face detection." International journal of computer vision 57.2 (2004): 137-154.*

Verkruysse, Wim, Lars O. Svaasand, and J. Stuart Nelson. "Remote plethysmographic imaging using ambient light." Optics express 16.26 (2008): 21434-21445.*

Unuma, Munetoshi, Ken Anjyo, and Ryozo Takeuchi. "Fourier principles for emotion-based human figure animation." Proceedings of the 22nd annual conference on Computer graphics and interactive techniques. ACM, 1995.*

Poh, Ming-Zher, Daniel J. McDuff, and Rosalind W. Picard. "Non-contact, automated cardiac pulse measurements using video imaging and blind source separation." Optics express 18.10 (2010): 10762-10774.*

Balakrishnan, Guha, Fredo Durand, and John Guttag. "Detecting pulse from head motions in video." Computer Vision and Pattern Recognition (CVPR), 2013 IEEE Conference on. IEEE, 2013.*

Timoner, Samson J. Subpixel motion estimation from sequences of video images. Diss. Massachusetts Institute of Technology, 1999.*

Timoner, Samson J., and Dennis M. Freeman. "Multi-image gradient-based algorithms for motion estimation." Optical engineering 40.9 (2001): 2003-2016.*

Lucas, Bruce D., and Takeo Kanade. "An iterative image registration technique with an application to stereo vision." IJCAI. vol. 81. 1981.*

Bai, J., et al., "Selectively de-animating video," *ACM Transactions on Graphics*, (2012).

Bojanic, S., et al., "Ocular microtremor: a tool for measuring depth of anaesthesia?" *British J. Anaestheia*, 86(4): 519-522 (2001).

Burt, P. and Adelson, E., "The laplacian pyramid as a compact image code," *IEEE Trans. Comm.*, 31(4): 532-540 (1983).

Fleet, D.J. and Jepson, A.D., "Computation of component image velocity from local phase information," *Int. J. Comput., Vision* 5(1): 77-104 (Sep. 1990).

Freeman, W.T., et al., "Motion without movement," *SIGGRAPH Comput. Graph.*, 25: 27-30 (Jul. 1991).

Fuchs, M., et al., "Real-time temporal shaping of high-speed video streams," *Computers & Graphics*, 34(5) : 575-584 (2010).

Gautama, T. and Van Hulle, M., "A phase-based approach to the estimation of the optical flow field using spatial filtering", *Neural Networks, IEEE Transactions*, 13(5): 1127-1136 (Sep. 2002).

Liu, C., et al., "Motion magnification", *ACM Trans. Graph.*, 24: 519-526 (Jul. 2005).

Portilla, J. and Simoncelli, E.D., "A parametric texture model based on joint statistics of complex wavelet coefficients," *Int. J. Comput. Vision*, 49(1): 49-70 (Oct. 2000).

Rolfs, M., "Microsaccades: Small steps on a long way," *Vision Res.*, 49(20): 2415-2441 (2009).

Rubinstein, M., et al., "Motion denoising with application to time-lapse photography," *IEEE Computer Vision and Pattern Recognition, CVPR*, pp. 313-320 (Jun. 2011).

Simoncelli, E.P. and Freeman, W.T., The steerable pyramid: a flexible architecture for multi-scale derivative computation, in *Proc. of the 1995 Int'l Conf. on Image Proc., IEEE Computer Society, ICIP*, Washington, DC, USA, 3: 3444 (1995).

Wang, J., et al., "The cartoon animation filter," *ACM Trans. Graph.*, 25: 1169-1173 (2006).

Wu, H.-Y., et al., "Eulerian video magnification for revealing subtle changes in the world," *ACM Trans. Graph. (Proc. SIGGRAPH)*, 31 (Aug. 2012).

Rubinstein, Miki, "Eulerian Video Magnification" You Tube, http://www.youtube.com/watch?v=ONZcjs1Pjmk, May 23, 2012, 3 pages.

* cited by examiner

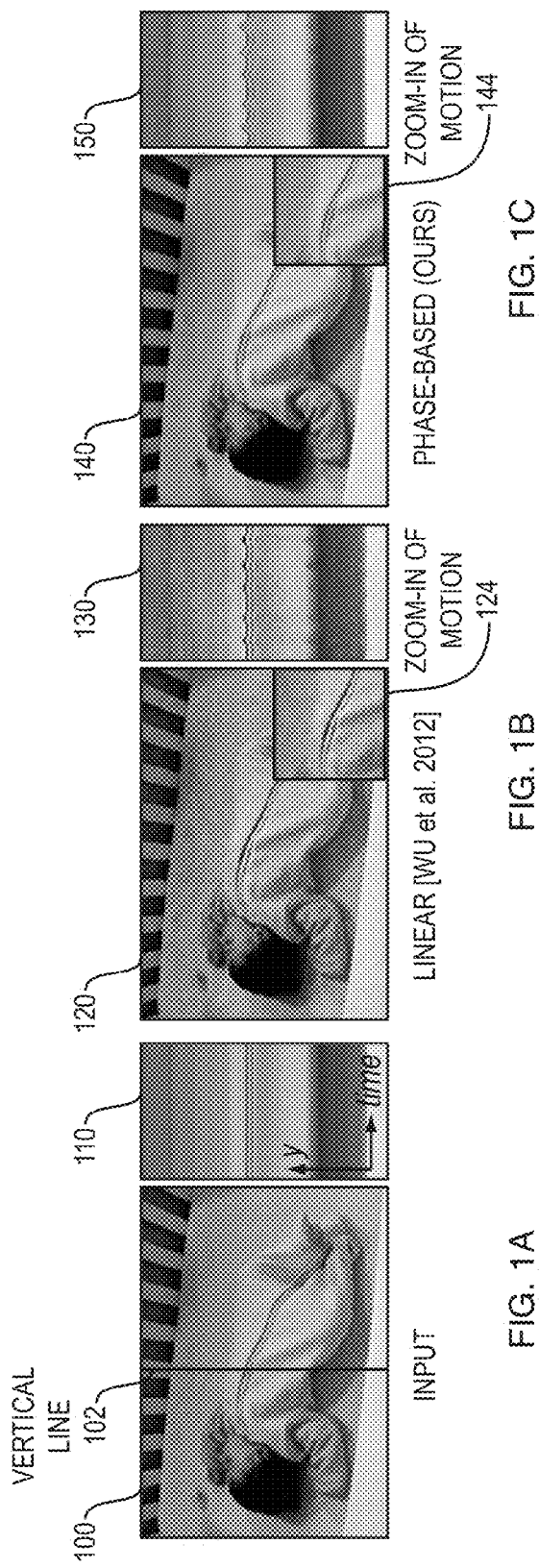

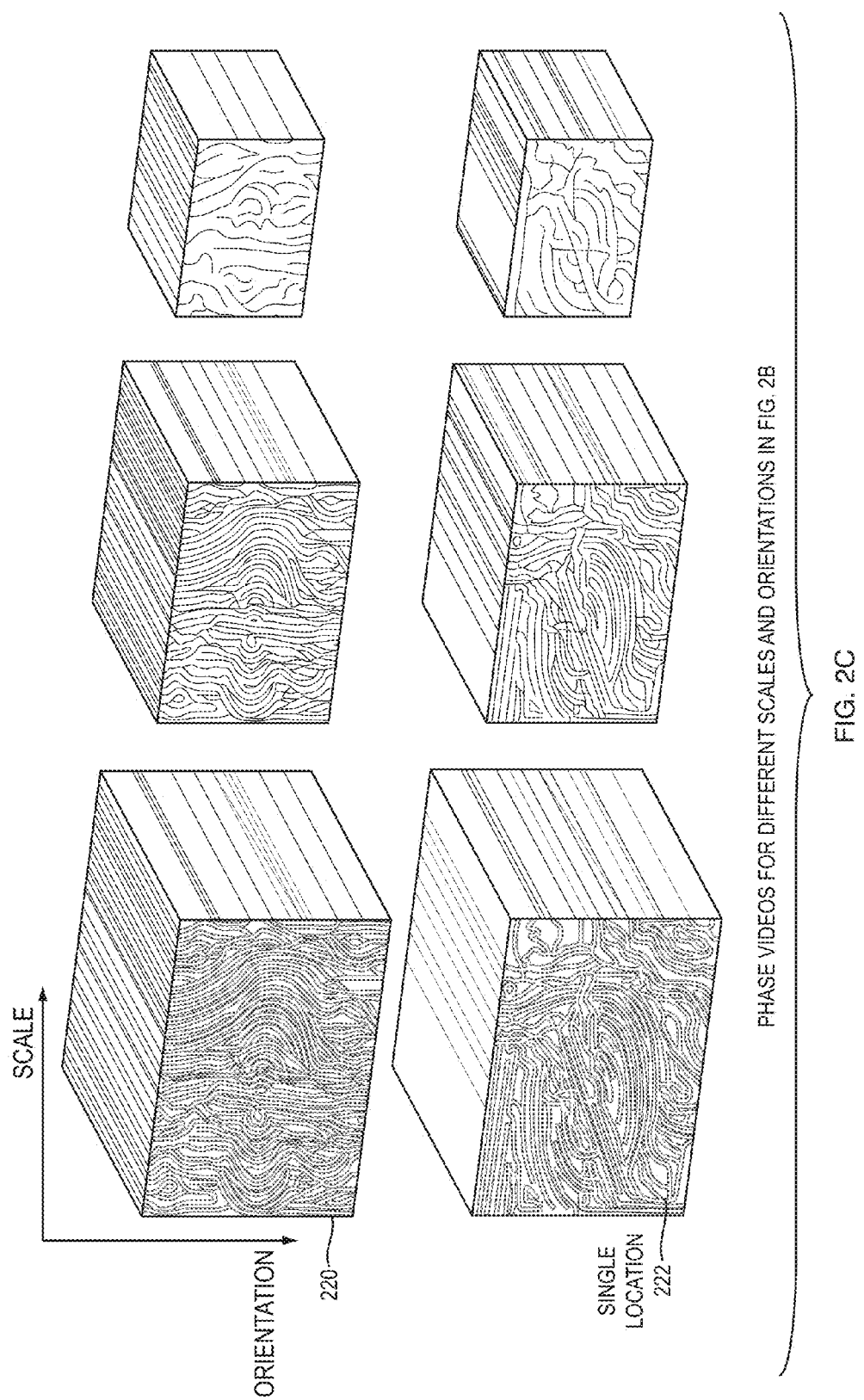

TRUE AMPLIFICATION

LINEAR

PHASE-BASED

ERROR AS FUNCTION OF WAVELENGTH

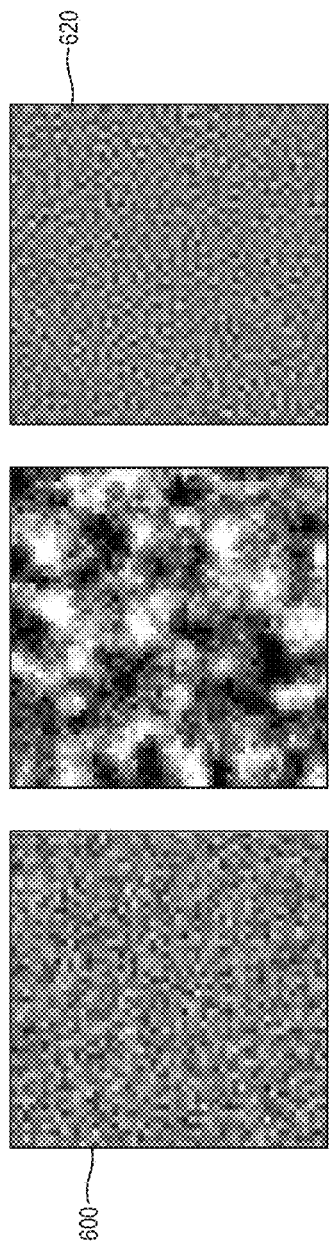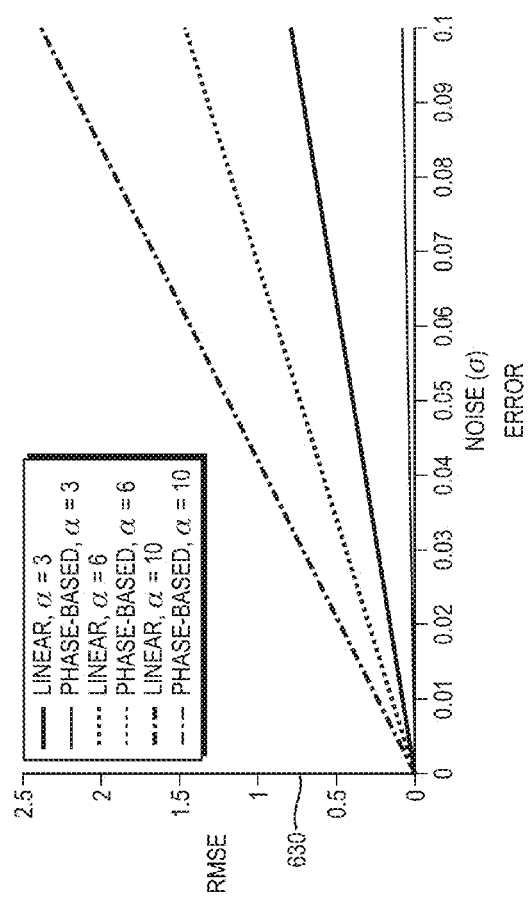
FIG. 6A INPUT
FIG. 6B LINEAR
FIG. 6C PHASE-BASED
FIG. 6D

EULERIAN MOTION MODULATION

BACKGROUND OF THE INVENTION

Phase-based Optical Flow.

Phase-based optical flow can track constant phase contours by computing the phase gradient of a spatio-temporally bandpassed video. This can provide an approximation to the motion field, and shows that phase is more robust than amplitude in detecting image changes due to contrast and scale. A similar technique computes the temporal gradient of the phases of a spatially bandpassed video to estimate the motion field.

Complex Steerable Pyramids.

Steerable pyramids, which can be viewed as extensions of Laplacian pyramids, are over complete representations of images that decompose the images along scale and orientation. The basis functions are similar to Gabor wavelets, which are sine curves multiplied by a smooth spatial envelope.

A steerable pyramid can be real-valued by having all real coefficients, but it can be extended to complex-valued coefficients where the sine curves of basis functions are replaced by a complex exponential. In other words, the real part represents an even-symmetric filter (cosine), while its imaginary counterpart represents an odd-symmetric filter (sine). While the real and imaginary parts increase the over completeness of the representation, the complex-valued steerable pyramid is a richer representation that separates the amplitude of the local wavelet from its phase.

SUMMARY OF THE INVENTION

The present method builds on the link between phase and motion, but avoids the explicit computation of flow vectors, and instead directly manipulates phase variations in videos. The present method further employs the phase component to process motion.

In one embodiment, a method of amplifying temporal variation in at least two images includes examining pixel values of the at least two images. The temporal variation of the pixel values between the at least two images is below a particular threshold. The method then applies signal processing to the pixel values.

In another embodiment, applying signal processing can amplify the variations of the pixel values between the at least two images. The signal processing can be temporal processing. The temporal processing can be a bandpass filter. The bandpass filter can be configured to analyze frequencies over time.

In another embodiment, applying signal processing includes spatial processing. The spatial processing can remove noise.

In another embodiment, a system for amplifying temporal variation in at least two images includes a pixel examination module configured to examine pixel values of the at least two images. The temporal variation of the pixel values between the at least two images is below a particular threshold. The system also includes a signal processing module configured to apply signal processing to the pixel values.

The embodiments of the system and method described above can be referred to as a "linear" system and method.

In another embodiment, a method of amplifying temporal variation in at least two images includes converting two or more images to a transform representation. The method further includes, for each spatial position within the two or more images, examining a plurality of coefficient values. The method additionally includes calculating a first vector based on the plurality of coefficient values. The first vector can represent change from a first image to a second image of the at least two images describing deformation. The method also includes modifying the first vector to create a second vector. The method further includes calculating a second plurality of coefficients based on the second vector.

In another embodiment, the transform representation is a pyramid. The pyramid can be a complex steerable value pyramid. The first and second pluralities of coefficient values can include real and imaginary parts of the coefficients.

In one embodiment, the first vector can be a scalar. Modifying the first vector to create the second vector can multiply the scalar by a constant. The first vector represents a change in phase from a first image of the at least two images and the second image of the at least two images.

In another embodiment, the method can also include generating at least one image based on the second plurality of coefficients.

In one embodiment, a system for amplifying temporal variation in at least two images can include a transform module configured to convert two or more images to a transform representation. The system can further include a coefficient examination module configured to, for each spatial position within the two or more images, examine a plurality of coefficient values. The system can further include a vector calculation module configured to calculate a first vector based on the plurality of coefficient values. The first vector can represent change from a first image to a second image of the at least two images describing deformation. The system can additionally include a vector modification module configured to modify the first vector to create a second vector. The system can also include a calculation module configured to calculate a second plurality of coefficients based on the second vector.

The embodiments of the system and method described above can be referred to as a "phase-based" system and method.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 1A-C are images illustrating motion magnification of a source video of a baby breathing.

FIG. 2C illustrates phase videos corresponding to different scales and orientations in FIG. 2B.

FIG. 6A illustrates a frame in a sequence of IID noise.

FIG. 6B illustrates motion amplified by an amplification factor, after employing the linear method.

FIG. 6c illustrates motion amplified by an amplification factor, after employing the phase-based method.

FIG. 6D illustrates a plot of the error as function of noise for each method, using several magnification factors.

DETAILED DESCRIPTION OF THE INVENTION

Figure 2A:
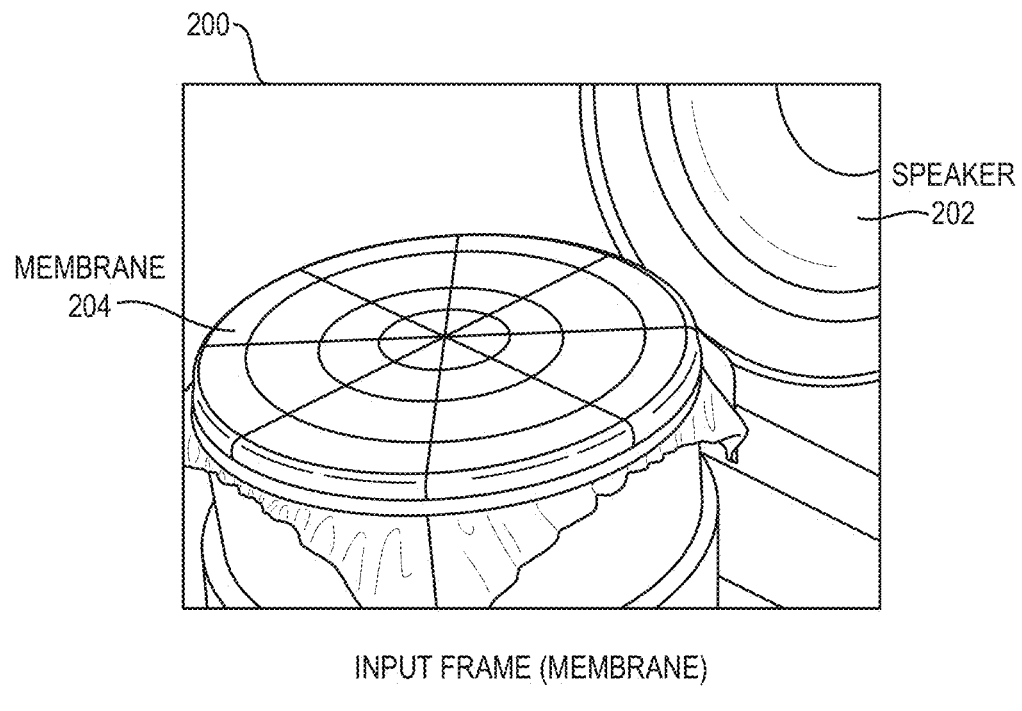
FIG. 2A illustrates an input frame from a video showing a membrane oscillating in response to a sound wave played by a speaker.

A description of example embodiments of the invention follows.

FIGS. 1A-C are images 100, 120, and 140 illustrating motion magnification of a source video of a baby breathing. FIG. 1A shows a frame 100 from an input sequence (baby), with a spatiotemporal vertical-line-versus-time (YT) slice 110 taken at the location marked by vertical line 102. FIGS. 1B and 1C show two different motion magnified frames 120 and 130, respectively, based on the input sequence with spatiotemporal YT slices 130 and 150, respectively, and a zoom-in of motion 124 and 144, respectively, on a patch around the baby's chest in the insets. The magnification method illustrated by FIG. 1B is a linear magnification method and the magnification method illustrated by FIG. 1C is phase-based. The magnification method illustrated by FIG. 1C supports larger magnification factors with less artifacts and noise compared to the magnification method illustrated by FIG. 1B.

The method and apparatus described herein magnifies and reveals small movements in videos based on a novel analysis of motion employing complex-valued image pyramids. Instead of employing computation of optical flow or motion vectors that Lagrangian methods require, the method shows that the variation of the phase of the coefficients of a complex-valued steerable pyramid over time corresponds to motion and can be temporally enhanced or modulated. The method is fast, and is more sensitive to noise than previous Eulerian approaches.

Many phenomena exhibit motions that are too small to be well perceived by the naked eye, and require computational amplification to be revealed. Lagrangian approaches compute velocity and warp frames of the video according to magnified velocity vectors, which additionally requires background inpainting. One Eulerian approach alleviates the need for costly flow computation, and performs processing in a separable manner in space and time. Eulerian video processing can also be employed to dampen temporal aliasing of motion in videos. Unfortunately, typical Eulerian video magnification supports relatively small magnification factors for high spatial frequencies, and tends to significantly amplify noise when the magnification factor is increased.

To solve these problems, the method presents a new Eulerian approach to motion magnification based on complex-valued steerable pyramids, inspired by phase-based optical flow and motion without movement. The local phase variation over time of the complex-valued steerable pyramid coefficients corresponds to motion. After computing this phase variation, temporal processing can amplify motion in selected temporal frequency bands and reconstruct a video.

The link between motion and phase in steerable pyramids can be analyzed to determine limits of the method, which are linked to phase wraparound and the spatial support of the steerable basis functions. The method improves on the previous Eulerian magnification method in two ways:

1) The method achieves twice the magnification of prior methods in theory and is at least as good in practice; and 2) The method has substantially better noise performance. Prior methods amplify noise linearly because they amplify temporal brightness changes. In contrast, the present method modifies phase, not amplitude, which translates noise without increasing its magnitude. The present method can achieve a greater degree of motion magnification while producing fewer artifacts in similar running times. Moreover, as the method supports larger degrees of motion modulation, it can further enable new applications for video manipulation such as motion fast forward, and motion pause.

Figure 2B:
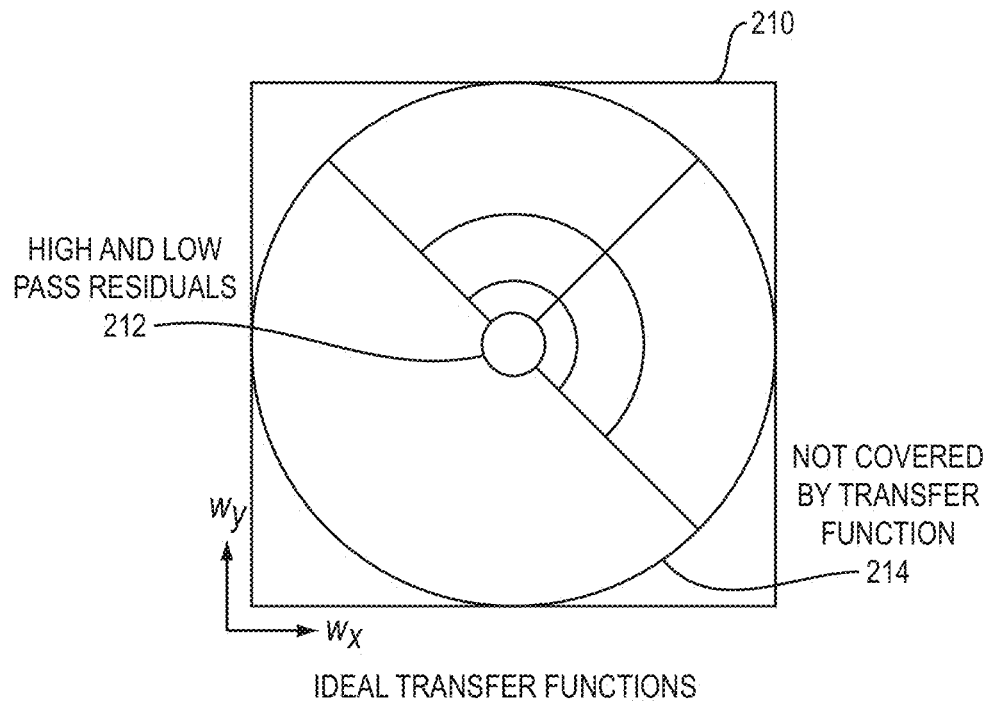
FIG. 2B illustrates ideal transfer functions of different filters in a complex steerable pyramid with three scales and two orientation bands, drawn on the spatial frequency plane.
Figure 2D:
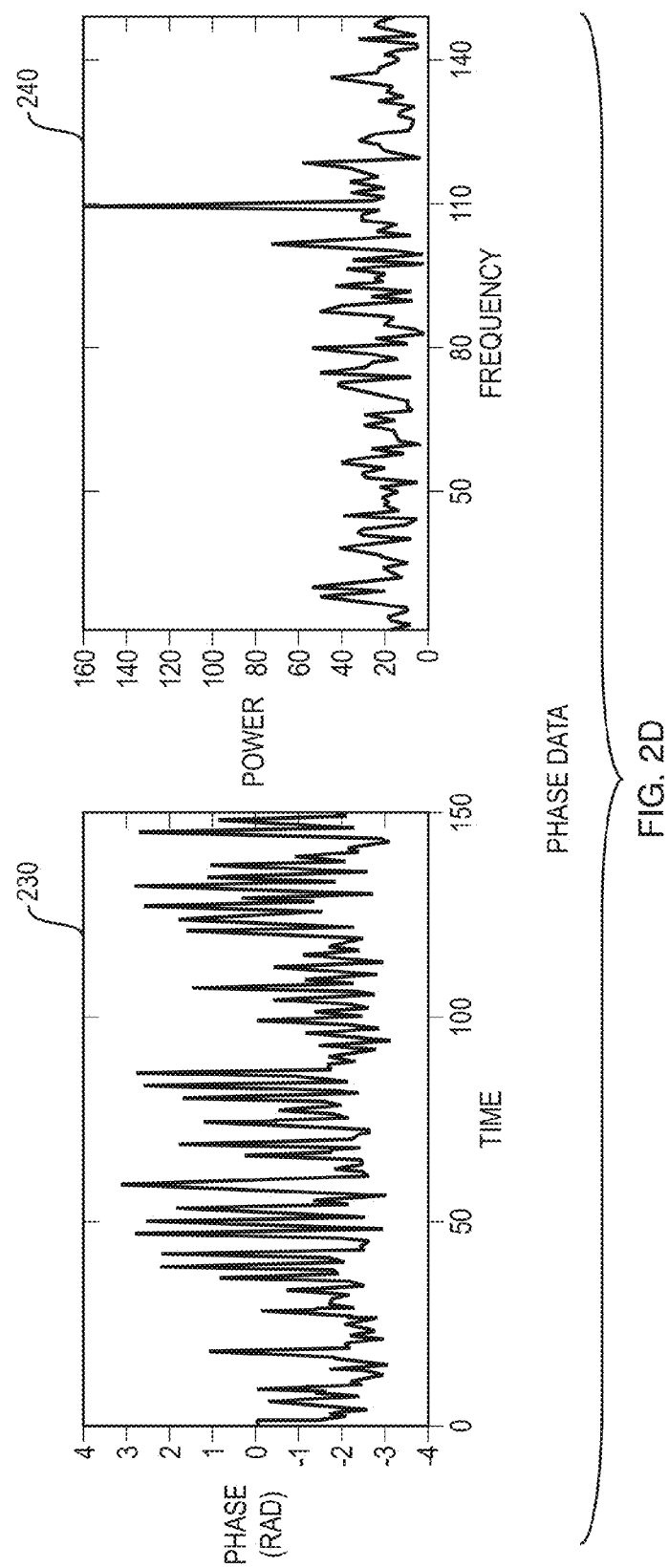
FIG. 2D illustrates observations of phase over time for a single location.
Figure 3A:
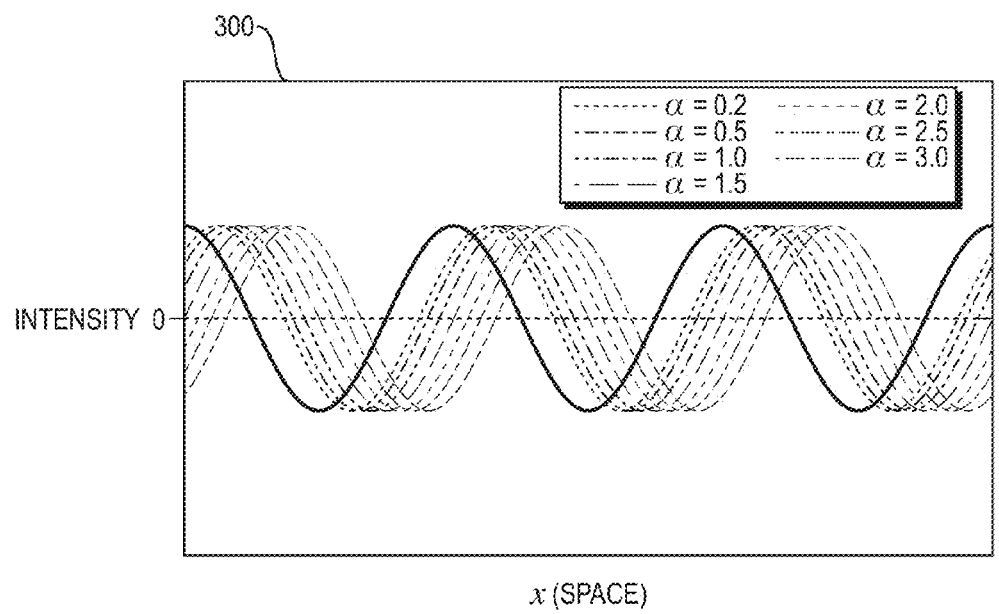
FIG. 3 illustrates phase-based motion magnification is optimized when using sinusoidal functions.
Figure 3B:
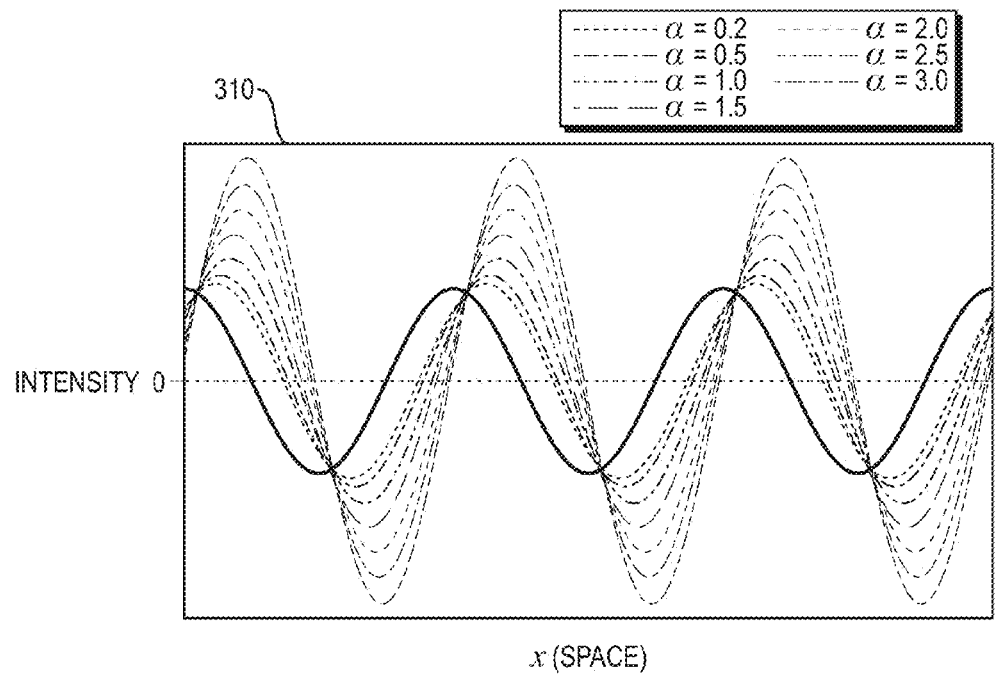
Figure 3C:
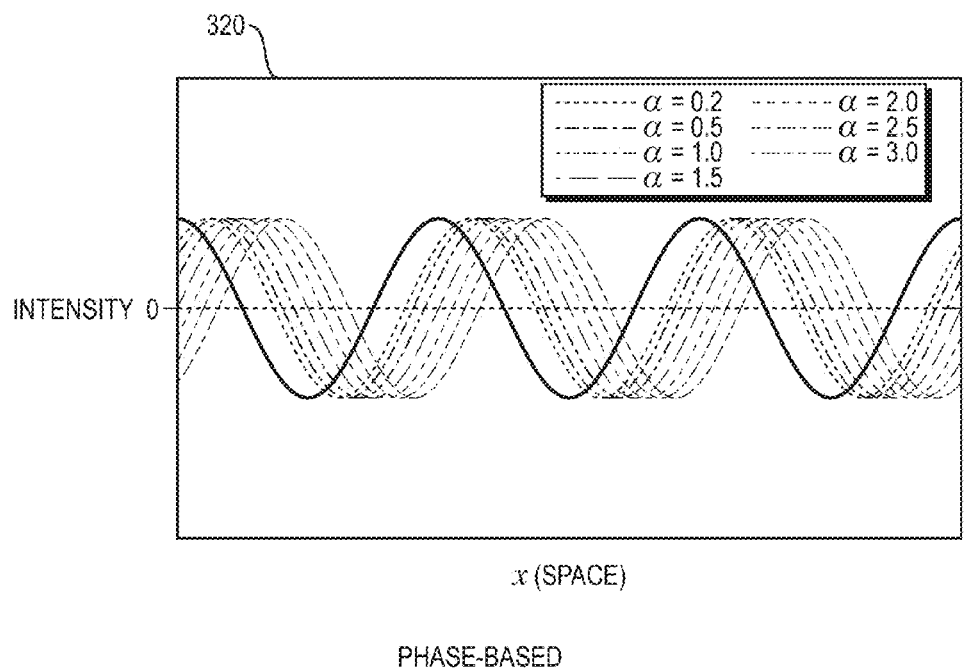
Figure 3D:
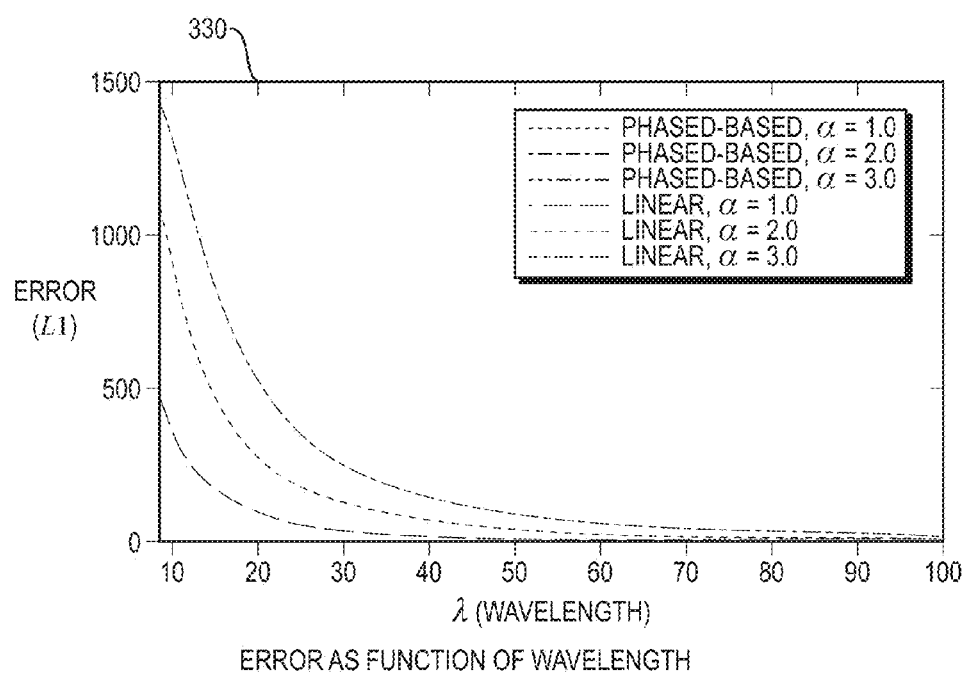

FIG. 2A illustrates an input frame 200 from a video showing a membrane 204 oscillating in response to a 110 Hz sound wave played by a speaker 202. FIG. 2B illustrates ideal transfer functions 210 of different filters in a complex steerable pyramid with three scales and two orientation bands, drawn on the spatial frequency plane (high and low pass residuals 212 in medium gray; black pixels 214 are not covered by the transfer functions). FIG. 2C illustrates phase videos 220 corresponding to different scales and orientations in FIG. 2B. FIG. 2D illustrates observations of phase over time for a single location 222 (FIG. 2C). Scale and orientation 230 reveals motions at the frequency of interest 240 (e.g., 110 Hz). By temporally filtering and amplifying the phase data, the method magnifies the motions in a required frequency range.

The steerable pyramid has high and low pass residuals that do not have orientation and are real-valued. The high and low pass residuals are identical to the corresponding levels in a real steerable pyramid. The transfer functions in the oriented bands of the steerable pyramid $\Psi_{\omega,\theta}$ are scaled, rotated copies indexed by scale $\omega$ and orientation $\theta$. The steerable pyramid is built by applying these transfer functions to the Fourier transform $\check{I}$ of an image $I$ to decompose it into different spatial frequency bands $S_{\omega,\theta}=\check{I}\Psi_{\omega,\theta}$. That is, the Fourier transform of each pyramid sub-band is obtained by multiplying the FFT of the image by a "mask" similar to those in FIG. 2B, which selects a range of frequencies and orientation. FIG. 2B shows that the positive frequency values $\omega$ are retained and that their symmetric $-\omega$ values are zeroed out. This is why, when the masked FFT is inverse-transformed back to the image domain, the corresponding sub-band has complex values.

In the frequency domain, the processing to build and then collapse the pyramid is given by $$\check{I}_R = \Sigma S_{\omega,\theta} \Psi_{\omega,\theta} = \Sigma \check{I} \Psi_{\omega,\theta}^2 \tag{1}$$

where the sums are over all of the scales and orientations in the pyramid. The processing is done in the frequency domain, but the method stores and uses the complex-valued results in the primal domain.

The transfer functions of a complex steerable pyramid only contain the positive frequencies of a real steerable pyramid's filter. That is, the response of $2\cos(\omega x) = e^{i\omega x} + e^{-i\omega x}$ is $e^{i\omega x}$ (see FIG. 2). The transfer functions mask regions, so that they are capable of isolating a range of frequencies as opposed to a single localized frequency.

Phase-based Motion Magnification

The present method computes the local phase at every scale and orientation. Then, the method temporally bandpasses these phases to isolate specific temporal frequencies and in particular remove the DC component. These temporally bandpassed phases correspond to motion in different scales and orientations. To synthesize magnified motion, the method multiplies by an amplification factor $\alpha$. The method then uses these amplified phase differences to magnify (or decrease) the motion in the sequence by modifying the phase of each frame by this amount.

Motion Modulation

In one example, the method analyzes a one-dimensional (1D) image intensity profile $f$ under pure translation over time, $f(x+\delta(t))$, for some displacement function $\delta(t)$. The method attempts to synthesize a motion-magnified sequence, $f(x+(1+\alpha)\delta(t))$, for the amplification factor $\alpha$.

Eulerian Video Magnification

First, a linear (e.g., Eularian) embodiment of the method applies a temporal filter to the intensity sequence. Assuming a DC balanced broadband temporal filter, this results in $$B(x, t) = \delta(t)\frac{\partial f}{\partial x} \quad (2)$$

which is then amplified and added back to the original frames. This leads to the following first-order approximation of the motion-magnified signal:

$$f(x) + (1+\alpha)\delta(t)\frac{\partial f}{\partial x} \approx f(x + (1+\alpha)\delta(t)) \quad (3)$$

This approximation holds for small values of $\alpha$ and $\delta(t)$ and low spatial frequencies, but breaks down quickly and causes artifacts (e.g., noise).

Phase-based Video Magnification

An embodiment of the phase-based method relies on complex-valued steerable pyramids because they afford a local notion of phase that allows direct shifting of the local Gabor-like wavelets that represent the image. The phase-based method employs a Fourier expression of the displaced image profile $f(x+\delta(t))$ as a sum of complex sinusoids.

$$f(x+\delta(t)) = \sum_{\omega=-\infty}^{\infty} A_\omega e^{i\omega(x+\delta(t))} \quad (4)$$

For this analysis, the phase-based method approximates the pyramid construction and assumes that the Fourier masks in FIG. 2B select a single frequency $\omega$ and angle $\theta$ per pyramid orientation band. Starting from Eq. 4, the primal-domain idealized pyramid level for frequency $\omega$ is $$S_{\omega,\theta}(x,t) = A_\omega e^{i\omega(x+\delta(t))} \quad (5)$$

FIG. 3 illustrates phase-based motion magnification is optimized when using sinusoidal functions. In these plots, the initial displacement is $\delta(t)=1$. True amplification 300 is illustrated compared to amplification using the linear embodiment 310 and the phase-based embodiment 320. While the errors for the technique of the linear embodiment 310 of the method are dependent on wavelength for sinusoids, any errors 330 from the phase-based embodiment 320 of the method are not dependent on wavelength and the error is uniformly small (e.g., all errors curves are superimposed about zero error in (d)).

The pixels of sub-band $S_{\omega,\theta}$ have complex values and their magnitude encodes the amplitude of the sine wave, while their complex phase depends on the pixel and varies according to the translating motion.

The phase-based embodiment of the method manipulates the phase of the bands of the pyramid. Similar to the linear magnification approach, the phase-based embodiment makes derivations simple by applying a DC balanced broadband temporal filter to the phase components, $\omega(x+\delta(t))$, for which the response for every scale and orientation is $$B_{\omega,\theta}(x,t) = \omega\delta(t) \quad (6)$$

The phase-based embodiment multiplies the bandpassed phase by amplification factor $\alpha$, takes a complex exponential, and multiplies the result by the corresponding scale and orientation band, to get $$\hat{S}_{\omega,\theta}(x, t) = S_{\omega,\theta}(x, t)e^{i\alpha B_{\omega,\theta}} \quad (7)$$
$$= A_\omega e^{i\omega(x+(1+\alpha)\delta(t))}$$

The phase-based embodiment receives the analytic signal at each scale and orientation, phase-shifted by $(1+\alpha)\delta(t)$. The phase-based embodiment obtains the output motion-magnified sequence by taking the real part of Eq. 7 recovering the negative spatial frequencies, and collapsing the steerable pyramid, which approximates $f(x+(1+\alpha)\delta(t))$.

FIG. 3 illustrates that the phase-based embodiment of the method is exact for sinusoidal waves, as such signals contain a single spatial frequency.

The linear embodiment of the method is exact in the case of linear ramps while the phase-based embodiment of the method is exact for sinusoidal waves (FIG. 3). However, both the linear and phase-based embodiments rely on spatial pyramids, where each level is bandlimited. Such spatially bandpassed images are better approximated by sinusoidal waves than linear ramps.

Figure 4A:
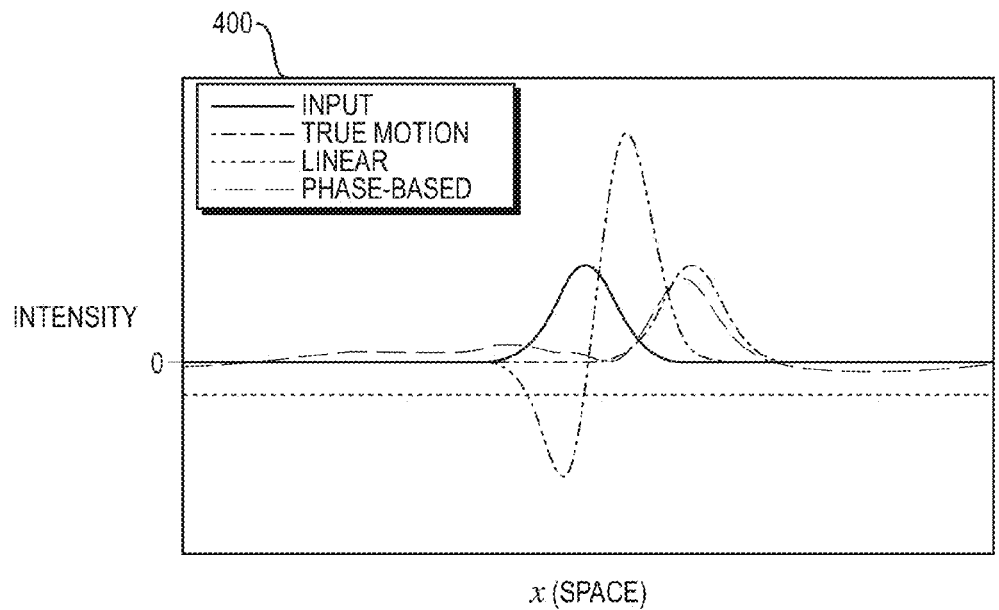
FIG. 4 illustrates diagrams showing the phase-based embodiment achieving performance being at least twice that of the linear embodiment without suffering from clipping artifacts for general non-periodic structures.
Figure 4B:
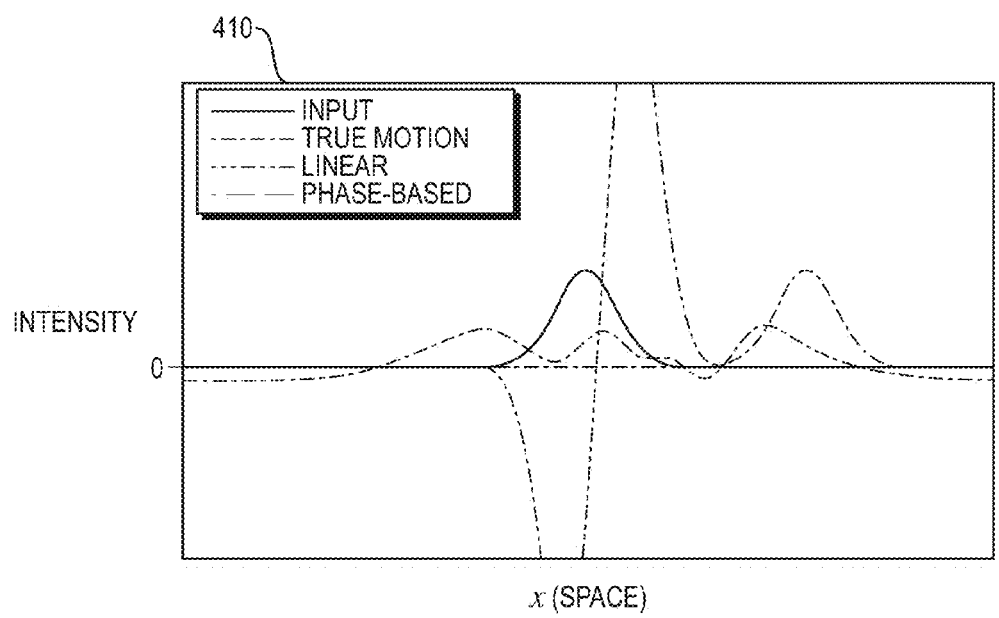

FIG. 4 illustrates diagrams 400 and 410 showing the phase-based embodiment achieving performance being at least twice that of the linear embodiment without suffering from clipping artifacts for general non-periodic structures. Wrap-around artifacts may become noticeable when structures are phase-shifted through $2\pi$ for large amplification (e.g., diagram 410).

Bounds Due to Wrap Around Effects

Wrap-around artifacts appear when the object is phase shifted through $2\pi$. Prior methods leveraged this effect to simulate motion without moving the image. However, the wrap-around is undesirable and ultimately limits the amount of motion magnification achievable.

To derive a bound on our approach to motion magnification, a single Dirac under uniform translation over time can be studied.

The impulse response of the steerable pyramid filters are well-approximated by Gabor filters. In one dimension, the method models one of the steerable pyramid filters as having its transfer function in the Fourier domain $$e^{-\pi(\omega_a-\omega_0)^2/\sigma^2} \quad (8)$$

where $\omega_0$ is the frequency for which the filter selects and $\sigma$ is the width of Gaussian window in the Fourier domain. This gives the following impulse response in the primal, which roughly corresponds to a pyramid level for a first frame at time zero:

$$S_{\omega,\theta}(x,0)=e^{-\pi x^2\sigma^2}e^{2\pi i\omega_0 x} \quad (9)$$

Respectively, the response of an impulse shifted by $\delta(t)$ pixels (pyramid level for a second frame, at time t) is $$S_{\omega,\theta}(x,t)=e^{-\pi(x-\delta(t))^2\sigma^2}e^{2\pi i\omega_0(x-\delta(t))} \quad (10)$$

Note that the spatial Gaussian envelope does not affect phase. Applying a finite difference bandpass filter to the phases of these two frames gives $$B_{\omega,\theta}(x,t)=2\pi\omega_0\delta(t) \quad (11)$$

The synthesized phase difference for modulating the motion by $\alpha$ is $$2\pi\omega_0\alpha\delta(t) \quad (12)$$

Figure 5A:
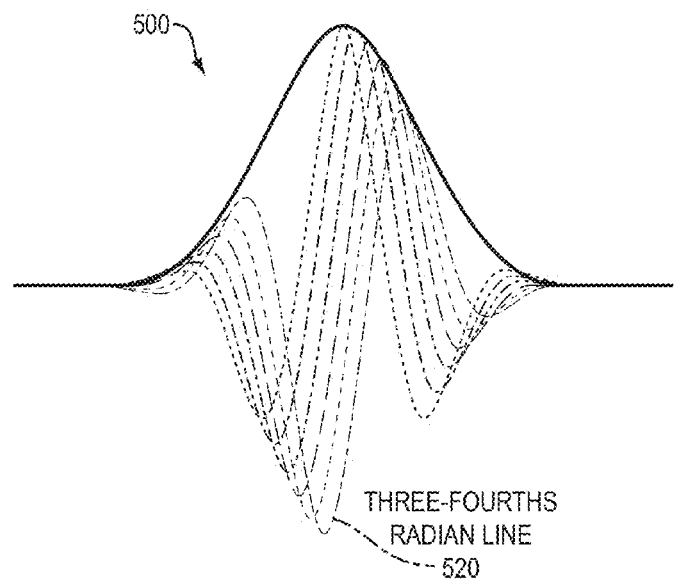
FIGS. 5A-B illustrate diagrams showing that if the phase is too large, the impulse moves under the Gaussian window eventually wraps around.
Figure 5B:
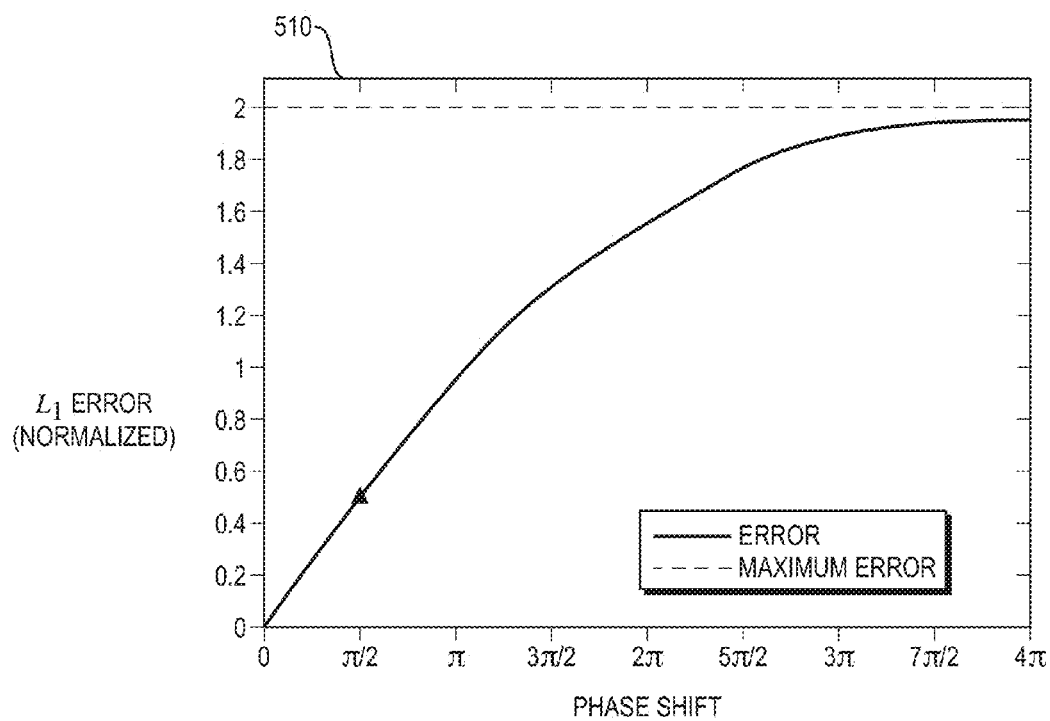

FIGS. 5A-B illustrate diagrams 500 and 510 showing that if the phase is too large, the impulse moves under the Gaussian window eventually wraps around. Thus, the phase in Eq. 12 should be bounded by a constant C. At $\pi$, there is full ambiguity between a phase change of $\pi$ and $-\pi$, so this value should be avoided.

FIG. 5A illustrates the impulse response of the steerable filter bank which shows the artifacts that arise when modulating phase to magnify motion. FIG. 5A further illustrates the impulse response of a wavelet being phase shifted. As the phase increases (three fourths radian line 520 corresponds to $3\pi/4$), the primary peak shifts to the right decreasing under the Gaussian window. A secondary peak forms to the left of the primary peak. If the phase is changed by $2\pi$, the secondary peak will replace the primary peak. FIG. 5B illustrates error in magnification of the impulse response as phase shift increases. The maximum (normalized) error occurs when the phase-shifted wavelet no longer overlaps with the true-shifted one. The constant $C=\pi/2$ is marked on the curve.

Empirically, $C=\pi/2$ is an example of an optimal cutoff. This gives the bound $\alpha\delta(t)$. By equating the spatial wavelength $$\alpha\delta(t) < \frac{\lambda}{4} \quad (13)$$

we get $$\lambda = \frac{1}{\omega 0},$$

From Eq. 13, low spatial frequencies can be magnified more than high spatial frequencies. Indeed, from Eq. 11, phase changes between frames are much greater for the high frequency components compared to the low frequency components. This bound improves over the one derived in the linear embodiment by a factor of 2, which we notice to be valid both on synthetic example (FIG. 4) as well as in natural videos (Sect. 4).

Sensitivity to Noise

Phase-based motion magnification has excellent noise characteristics. As the amplification factor is increased, noise is translated rather than amplified. At a particular scale and orientation band, the response for a noisy image I+σn might be $$S_{\omega,\theta}=e^{i\omega(x+\delta(t))}+\sigma N_{\omega,\theta}(x,t) \quad (14)$$

σ is much lower in magnitude than the noiseless signal, so that temporal filtering of the phase is approximately $\omega\delta(t)$ as in Eq. 6. To magnify the motion, the response in the Eq. 14 is shifted by $e^{i\alpha\omega\delta(t)}$, so that the motion magnified band is $$\hat{S}_{\omega,\theta}=e^{i\omega(x+(1+\alpha)\delta(t))}+\sigma e^{i\alpha\omega\delta(t)}N_{\omega,\theta}(x,t) \quad (15)$$

The only change to the noise after processing is a phase shift. When the pyramid is collapsed, this phase shift corresponds to a translation of the noise. In contrast, the linear embodiment amplifies the noise linearly in proportion to $\alpha$.

Results

In the phase-based method, all processing is performed using a complex steerable pyramid with scales that are an octave apart and four orientations. Complex steerable pyramid code computes the filter responses in the frequency domain. Processing is performed in YIQ color space, so that the amplification factor could be attenuated in the chrominance channels. It took an order of a few minutes to process a 512×512 pixel video with 300 frames using non-optimized MATLAB code on a machine with 12 cores and 64 GB of RAM. It can be efficiently implemented to run in real time similar to the linear embodiment as computing a steerable—rather than Laplacian-decomposition introduces only a minor performance overhead. The user has control over the amplification factor and the temporal bandpass filter.

FIGS. 6A-D illustrate comparisons between linear and phase-based Eulerian motion magnification in handling noise. FIG. 6A illustrates a frame 600 in a sequence of IID noise. FIGS. 6B-C illustrate motion 610 and 620 amplified by a factor of 50, where FIG. 6B employs the linear method and FIG. 6C employs the phase-based method. FIG. 6D illustrates a plot 630 of the error as function of noise for each method, using several magnification factors, showing the advantages of the proposed approach.

The phase-based method can be applied to a set of natural and synthetic videos, and the results can be compared with the some of them ones by the linear embodiment. The results on baby (FIG. 1), and guitar and camera (FIG. 7) confirm our noise analysis and derived bounds on amplification. In particular, the magnified motions in the results of the phase-based method (e.g. the respiratory motions of the baby and vibrating guitar strings) looks crispier, and contain significantly less artifacts and noise compared to the linear embodiment. At the cost of moderate artifacts, the phase-based embodiment can magnify the motion of camera dramatically more than previous Eulerian techniques.

The phase-based embodiment can magnify microsaccades, which are subtle, involuntary, low amplitude (10-400 micron) movements in the human eye. The sample video of the microsaccades is taken with a high speed camera at 500 Hz. The phase-based embodiment processed a one second (500 frame) sequence with an ideal bandpass signal with passband between 30 Hz and 50 Hz. The phase-based embodiment applies a spatial mask to the phase shifts to emphasize the motion around the iris. Such a detection system can have clinical applications, as the frequency content of ocular microtremor can have clinical significance.

Figure 7:
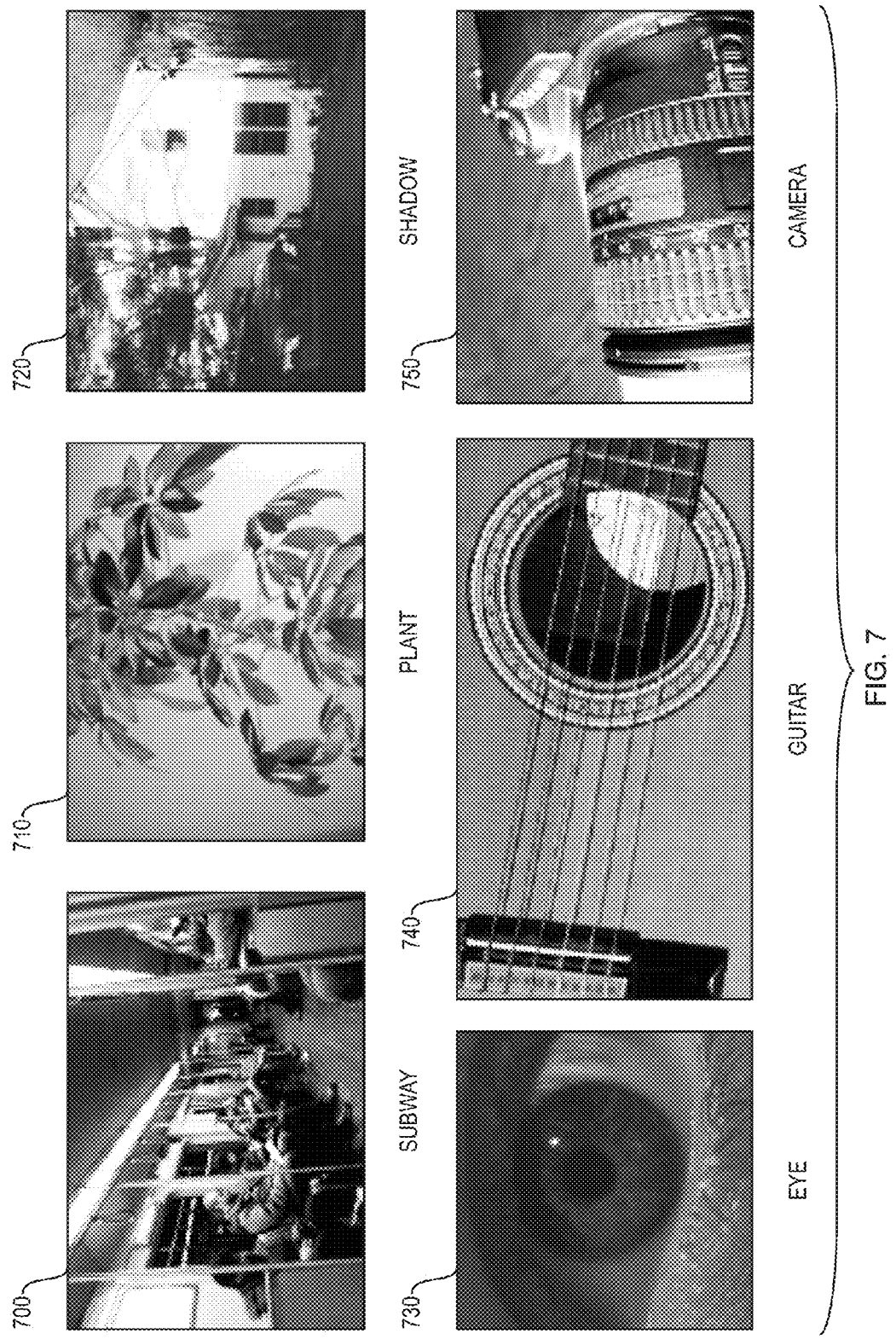
FIG. 7 illustrates representative frames from videos used to demonstrate the methods described herein.

FIG. 7 illustrates representative frames 700, 710, 720, 730, 740 and 750 from videos used to demonstrate the methods.

In another demonstration, a tense membrane is made of a sheet of rubber mounted on a section of PVC pipe using a rubber band. A loudspeaker vibrates air that in turn vibrates the membrane. A high speed camera captures the result. The membrane has two modes when waveforms at 76 Hz and 110 Hz are sent through the loudspeaker. A video of the membrane is captured when a composite waveform of these two frequencies are played through the loudspeaker. The phase-based embodiment separates and amplifies these two modes.

As the embodiments support large amplification factors, a user can increase the amplification, $\alpha$, with time to simulate motion fast forwarding. This creates the illusion of speeding up time. For example, the phase-based embodiment can speed up motion of a shadow moving over time and show what would happen if the sequence had been recorded for a longer period of time.

The phase-based embodiment also allows pausing motions in videos. The phase-based embodiment can remove low amplitude short term motions from videos while larger amplitude motions continue to pass through. This is similar to motion denoising and video de-animation, but can be done in real-time in the phase-based embodiment. To pause the motion in a sequence, the phase-based embodiment computes the phases for a single reference frame and sets the phases in the entire video equal to that of the reference frame. The result is not the same as a constant reference frame as the coefficient amplitudes are still evolving over time. For example, the phase-based embodiment can remove the motion of the subway car while the car passes through the tunnel. In another example, the phase-based embodiment can remove the rustling of the leaves while the illumination in the scene changes.

Discussion

Lagrangian approaches to motion magnification can amplify the motion in a video arbitrarily, but rely on accurate optical flow estimates, image segmentation, and inpainting. Like the Lagrangian approach, the phase-based embodiment translates structures within the image. However, it does not involve lengthy computation and it can run in real time. The approach is limited by the fact that structures cannot be translated beyond the spatial envelopes of the steerable pyramid. High frequencies cannot be translated as far as low frequencies and this leads structure to break up as the low frequency components translate beyond the high frequency ones.

Figure 8:
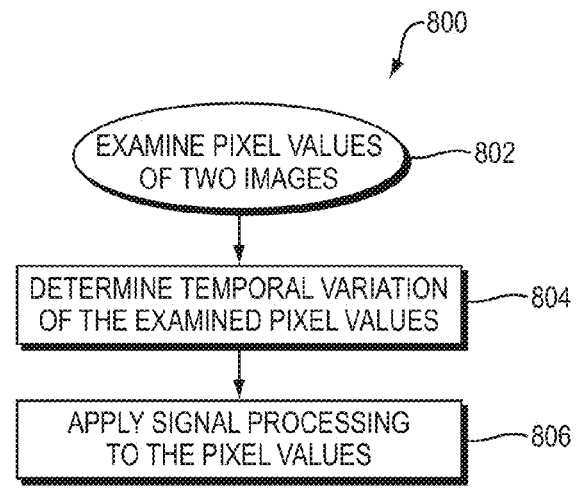
FIG. 8 is a flow diagram illustrating an example embodiment of the Eulerian embodiment of the method described herein.

FIG. 8 is a flow diagram 800 illustrating an example embodiment of the Eulerian embodiment of the method described herein. The Eulerian-based method begins by examining pixel values of two or more images (802). The method then determines the temporal variation of the examined pixel values (804). The method is designed to amplify only small temporal variations. While the method can be applied to large temporal variations, the advantage in the method is provided for small temporal variations. Therefore the method is optimized when the input video has small temporal variations between the images. The method then applies signal processing to the pixel values (806). For example, signal processing can amplify the determined temporal variations, even when the temporal variations are small.

Figure 9:
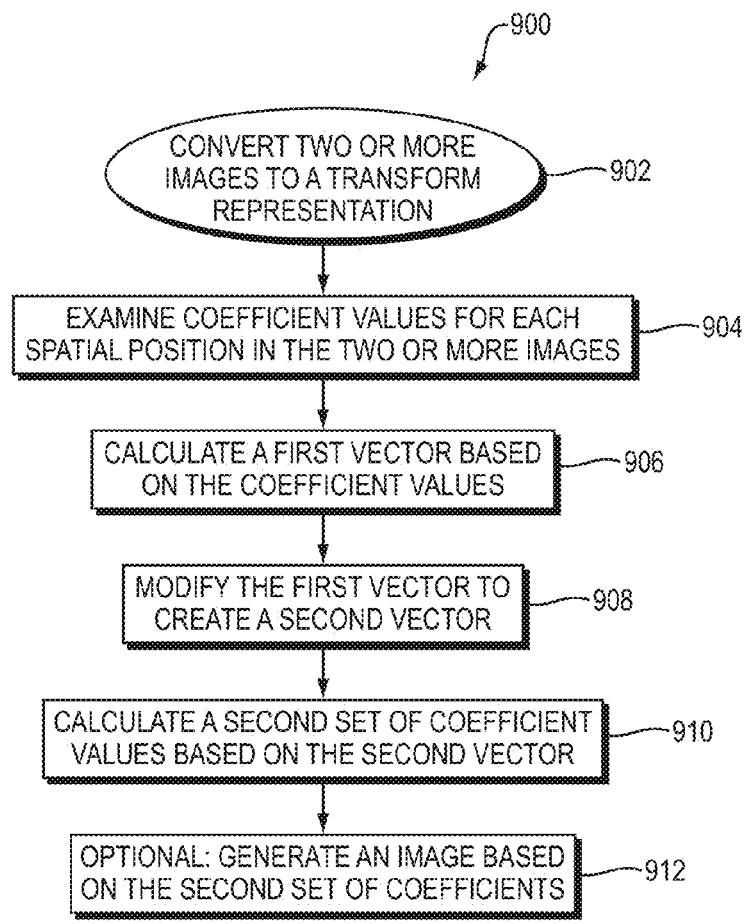
FIG. 9 is a flow diagram illustrating an example of embodiment of the phase-based method described in this application.

FIG. 9 is a flow diagram 900 illustrating an example of embodiment of the phase-based method described in this application. The phase-based method begins by converting two or more images to a transform representation (902). Then, the method examines coefficient values for each spatial position in the two or more images (904). The method then calculates a first vector based on the coefficient values (906). Then, the method modifies the first vector to create a second vector (908). The second vector represents amplified movement between the two images. The method then calculates a second set of coefficient values based on the second vector (910). Then, optionally, the method generates an image based on the second set of coefficients (912). This generated image should have the motion amplified according to the second vector.

Figure 10:
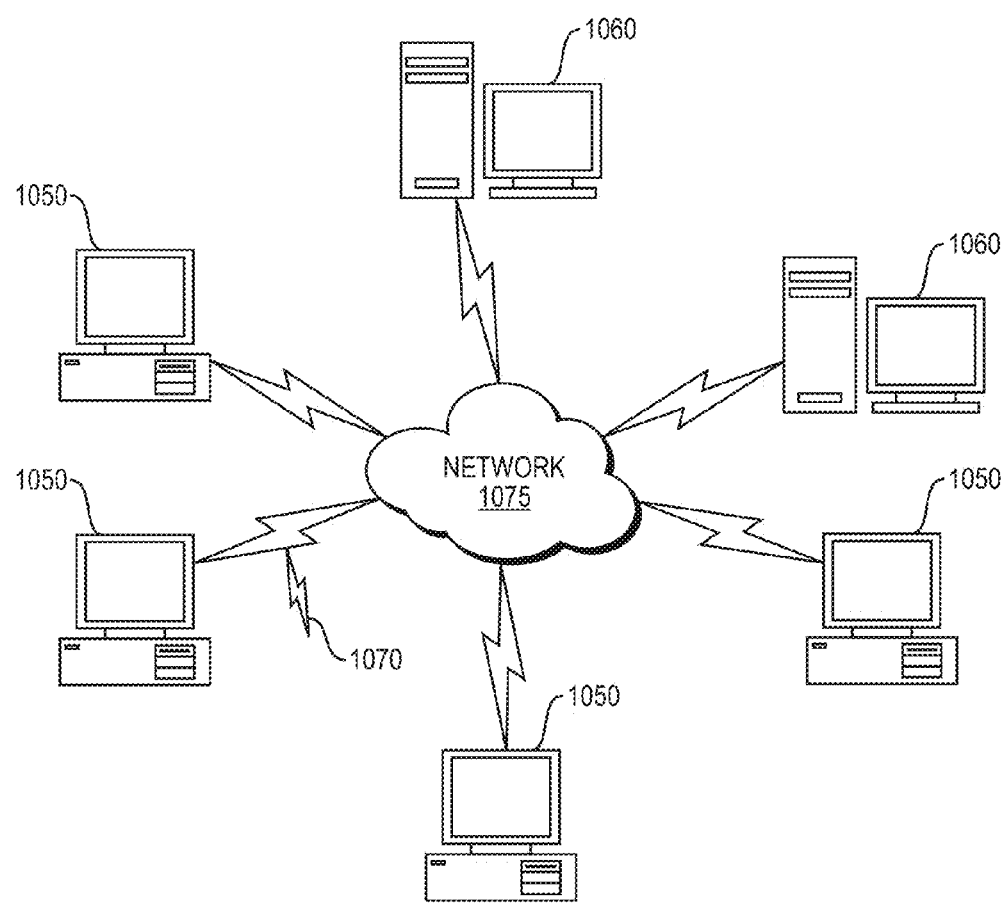
FIG. 10 illustrates a computer network or similar digital processing environment in which the present invention may be implemented.

FIG. 10 illustrates a computer network or similar digital processing environment in which the present invention may be implemented.

Client computer(s)/devices 1050 and server computer(s) 1060 provide processing, storage, and input/output devices executing application programs and the like. Client computer(s)/devices 1050 can also be linked through communications network 1075 to other computing devices, including other client devices/processes 1050 and server computer(s) 1060. Communications network 1075 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 11:
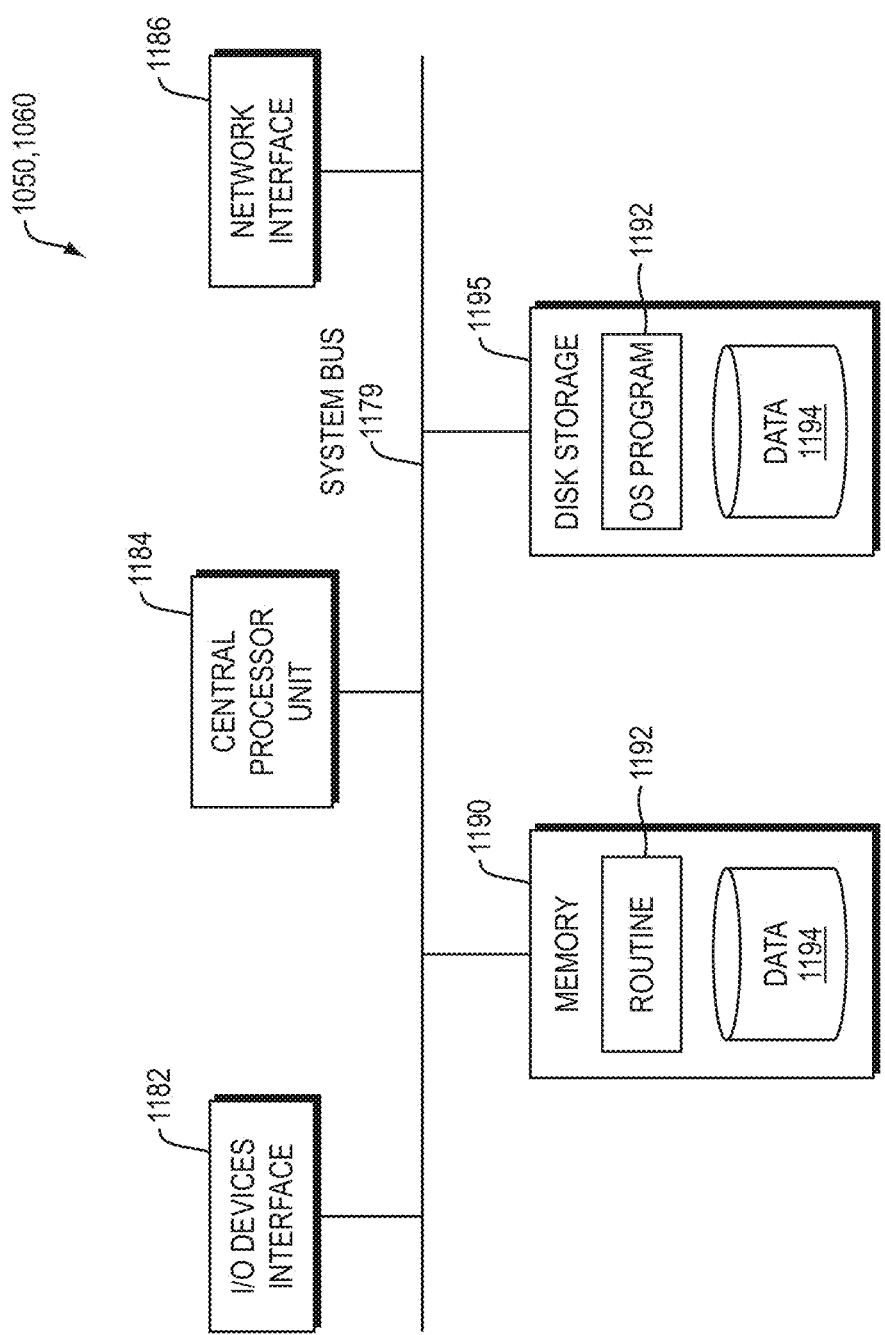
FIG. 11 is a diagram of the internal structure of a computer (e.g., client processor/device or server computers) in the computer system of FIG. 10.

FIG. 11 is a diagram of the internal structure of a computer (e.g., client processor/device 1050 or server computers 1060) in the computer system of FIG. 10. Each computer 1050, 1060 contains system bus 1179, where a bus is a set of hardware lines used for data transfer among the components of a computer or processing system. Bus 1179 is essentially a shared conduit that connects different elements of a computer system (e.g., processor, disk storage, memory, input/output ports, network ports, etc.) that enables the transfer of information between the elements. Attached to system bus 1179 is I/O device interface 1182 for connecting various input and output devices (e.g., keyboard, mouse, displays, printers, speakers, etc.) to the computer 1050, 1060. Network interface 1186 allows the computer to connect to various other devices attached to a network (e.g., network 1075 of FIG. 10). Memory 1190 provides volatile storage for computer software instructions 1192 and data 1194 used to implement an embodiment of the present invention (e.g., motion magnification code detailed above). Disk storage 1195 provides non-volatile storage for computer software instructions 1192 and data 1194 used to implement an embodiment of the present invention. Central processor unit 1184 is also attached to system bus 1179 and provides for the execution of computer instructions.

In one embodiment, the processor routines 1192 and data 1194 are a computer program product (generally referenced 1192), including a computer readable medium (e.g., a removable storage medium such as one or more DVD-ROM's, CD-ROM's, diskettes, tapes, etc.) that provides at least a portion of the software instructions for the invention system. Computer program product 1192 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 1070 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 1192 is a propagation medium that the computer system 1050 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to example embodiments thereof, it will be understood by those skilled in the art that various changes in form and details may be made therein without departing from the scope of the invention encompassed by the appended claims.

What is claimed is:

1. A method of amplifying temporal variation in at least two images, the method comprising:
    for each particular pixel of the at least two images, detecting a temporal variation of the particular pixel of the at least two images by applying a bandpass filter configured to analyze frequencies over time, the resulting detected temporal variation of the particular pixel between the two images being below a particular threshold; and
    amplifying the detected temporal variation of each particular pixel; and
    providing at least two modulated images by adding the amplified temporal variation to the at least two images by synthesizing the modulated images, for an amplification factor $\alpha$, according to $f(x+(1+\alpha)\delta(t))$, $\delta(t)$ being a displacement function.

2. The method of claim 1, wherein detecting the temporal variation employs temporal processing.

3. The method of claim 1, wherein detecting the temporal variation employs spatial processing, the spatial processing removing noise.

4. A system for amplifying temporal variation in at least two images, the system comprising:
    a pixel examination module configured to, for each particular pixel of the at least two images, detect a temporal variation of the particular pixel of the at least two images by applying a bandpass filter configured to analyze frequencies over time, the resulting detected temporal variation of the particular pixel between the two images being below a particular threshold; and
    a signal processing module configured to:
    amplify the detected temporal variation of each particular pixel, and
    provide at least two modulated images by adding the amplified temporal variation to the at least two images by synthesizing the modulated images, for an amplification factor $\alpha$, according to $f(x+(1+\alpha)\delta(t))$, $\delta(t)$ being a displacement function.

5. The system of claim 4, wherein the pixel examination module is further configured to detect temporal variation by employing temporal processing.

6. The system of claim 4, wherein the pixel examination module is further configured to employ spatial processing, the spatial processing removing noise.

7. The method of claim 1, wherein applying the bandpass filter further includes, for each pixel value, analyzing a one-dimensional (1D) image intensity profile.

8. The method of claim 7, wherein the 1D image intensity profile is based on a function $f(x+\delta(t))$, where $\delta(t)$ is a displacement function.

9. The system of claim 4, wherein the pixel examination module is further configured to, for each pixel value, analyzing a one-dimensional (1D) image intensity profile.

10. The system of claim 9, wherein the 1D image intensity profile is based on a function $f(x+\delta(t))$, where $\delta(t)$ is a displacement function.

\* \* \* \* \*